United States Patent [19]

Mori

[11] Patent Number: 4,591,853
[45] Date of Patent: May 27, 1986

[54] PAGING RECEIVER WITH A DECODER-P-ROM

[75] Inventor: Toshihiro Mori, Tokyo, Japan

[73] Assignee: Nippon Electric Co., Ltd., Tokyo, Japan

[21] Appl. No.: 440,724

[22] Filed: Nov. 10, 1982

[30] Foreign Application Priority Data

Nov. 16, 1981 [JP] Japan ................................ 56-183373

[51] Int. Cl.[4] .................... H04Q 9/00; H04B 1/16; G08B 7/00
[52] U.S. Cl. ............................ 340/825.44; 340/146.2
[58] Field of Search ............... 340/825.44, 825.45, 340/825.62, 825.52, 825.3, 146.2, 825.48; 365/220, 221

[56] References Cited

U.S. PATENT DOCUMENTS

| | | | |
|---|---|---|---|
| 2,973,507 | 2/1961 | Grondin | 340/825.65 |
| 4,103,286 | 7/1978 | Nicolini et al. | 340/146.2 |
| 4,119,946 | 10/1978 | Taylor | 340/146.2 |
| 4,142,177 | 2/1979 | Davis | 340/825.65 |
| 4,160,240 | 7/1979 | Partipilo | 340/825.44 |
| 4,245,212 | 1/1981 | Cirimele | 340/825.62 |
| 4,330,780 | 3/1982 | Masaki | 340/825.44 |
| 4,353,065 | 10/1982 | Mori | 340/825.44 |
| 4,414,676 | 11/1983 | Kraul et al. | 340/146.2 |
| 4,422,071 | 12/1983 | de Graaf | 340/825.44 |
| 4,506,262 | 3/1985 | Vance et al. | 340/825.44 |
| 4,518,961 | 5/1985 | Davis et al. | 340/825.44 |

FOREIGN PATENT DOCUMENTS 2062320  4/1981  United Kingdom ........... 340/825.44

*Primary Examiner*—Donald J. Yusko
*Attorney, Agent, or Firm*—Blakely, Sokoloff, Taylor & Zafman

[57] ABSTRACT

A paging receiver comprises a P-ROM with a built-in decoder for storage of N kinds of information. The stored contents of the P-ROM are read out in series in response to a clock frequency equal to or greater than N times the clock corresponding to the data speed of a received signal. Substantially simultaneous comparison of N kinds of the read-out data with the received signal is effected to determine whether or not the received signal is a paging signal for the own receiver.

4 Claims, 8 Drawing Figures

4,591,853

PAGING RECEIVER WITH A DECODER-P-ROM

BACKGROUND OF THE INVENTION

This invention relates to paging receivers. More particularly, it relates to a receiver capable of receiving a plurality of paging numbers with a small-scale circuit construction.

With recent increase of data quantity and increase of subscribers, present-day paging receivers have a trend for replacing the conventional tone signal processing with digital signal processing. Employed in the digital signal processing is a signal format of a so-called multi-address such as a code proposed by British Telecom in England which is commonly termed POCSAG (Post Office Code Standardization Advisory Group) code.

In the paging receiver, it is necessary to assure read out of codes corresponding to multi-addresses independently stored in a P-ROM (Programmable Read Only Memory) for simultaneously comparing four different codes with a received input signal. The prior art P-ROM, however, has a large number of wiring conductors between a decoder and the P-ROM and encounters difficulties in its incorporation in the receiver. In addition, the decoder requires a large-scale circuit construction. This rather goes back on the recent trend for reduced scale and increased package density.

SUMMARY OF THE INVENTION

An object of this invention is to provide a paging receiver capable of receiving a plurality of paging numbers which can be materialized at high package density.

Another object of this invention is to provide a paging receiver which can reduce the number of wiring conductors between a decoder and a P-ROM to improve package density of the receiver.

According to the invention, a paging receiver comprises a P-ROM with a built-in decoder for storage of N kinds of information. The stored contents of the P-ROM are read out in series in response to a clock frequency equal to or greater than N times the clock corresponding to the data speed of a received signal. Substantially simultaneous comparison of N kinds of the read-out data with the received signal is effected to determine whether or not the received signal is a paging signal for the own receiver.

Specifically, when each of the N kinds of information stored in the P-ROM has an m-bit structure such as A1·A2·...Am, B1·B2·...Bm,..., X1·X2·...Xm, bits of the output of the P-ROM are preferably rearranged into a series of bits A1·B1·...X1·A2·B2·...X2...·Am·Bm...·Xm, in which corresponding bits in the respective kinds of information are grouped.

In the above, N is an integer greater than 1, m is an integer greater than 1, and the order of bits in each group may be arbitrary so long as it is the same for the individual groups.

DESCRIPTION OF PREFERRED EMBODIMENT

Prior to describing the invention by way of example, a digital signal format adopted in paging receivers, a P-ROM to be incorporated into the invention and a prior art system for reception of two kinds of 32-bit paging numbers will first be described for better understanding of the present invention.

Figure 1:
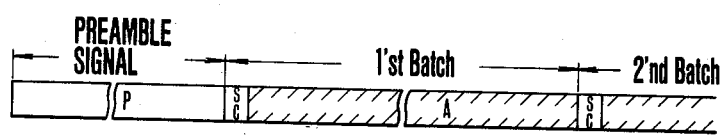
FIG. 1 is a diagrammatic representation showing an example of a signal format adopted in paging receivers.
Figure 2:
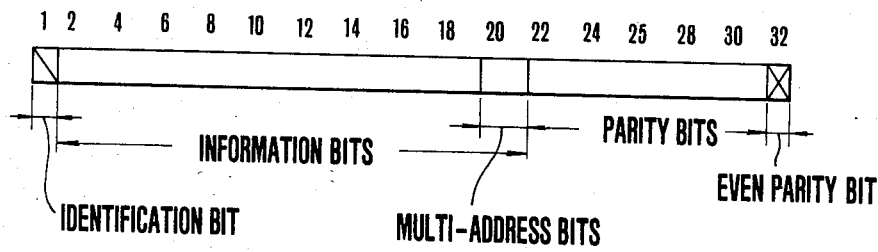
FIG. 2 is a diagrammatic representation showing an example of code of a paging signal (at A in FIG. 1) in the form of a BCH (31, 21)+1 code.

FIG. 1 shows the POCSAG code mentioned previously. In this code, a portion A constitutes a paging signal. FIG. 2 shows an address code format used for an address signal section of the signal shown in FIG. 1. In this structure, a one-bit even parity bit is added to a BCH (31, 21) code which is a sort of cyclic code. Among the 21 information bits, 20 bits, other than an MSB (most significant bit) as identification bit, constitute a paging number. In the POCSAG system, four different codes are assigned to a receiver by operating two LSBs (least significant bits) among the 20 information bits. A system in which a plurality of different numbers are assigned to each receiver is called a multi-address system.

Figure 3:
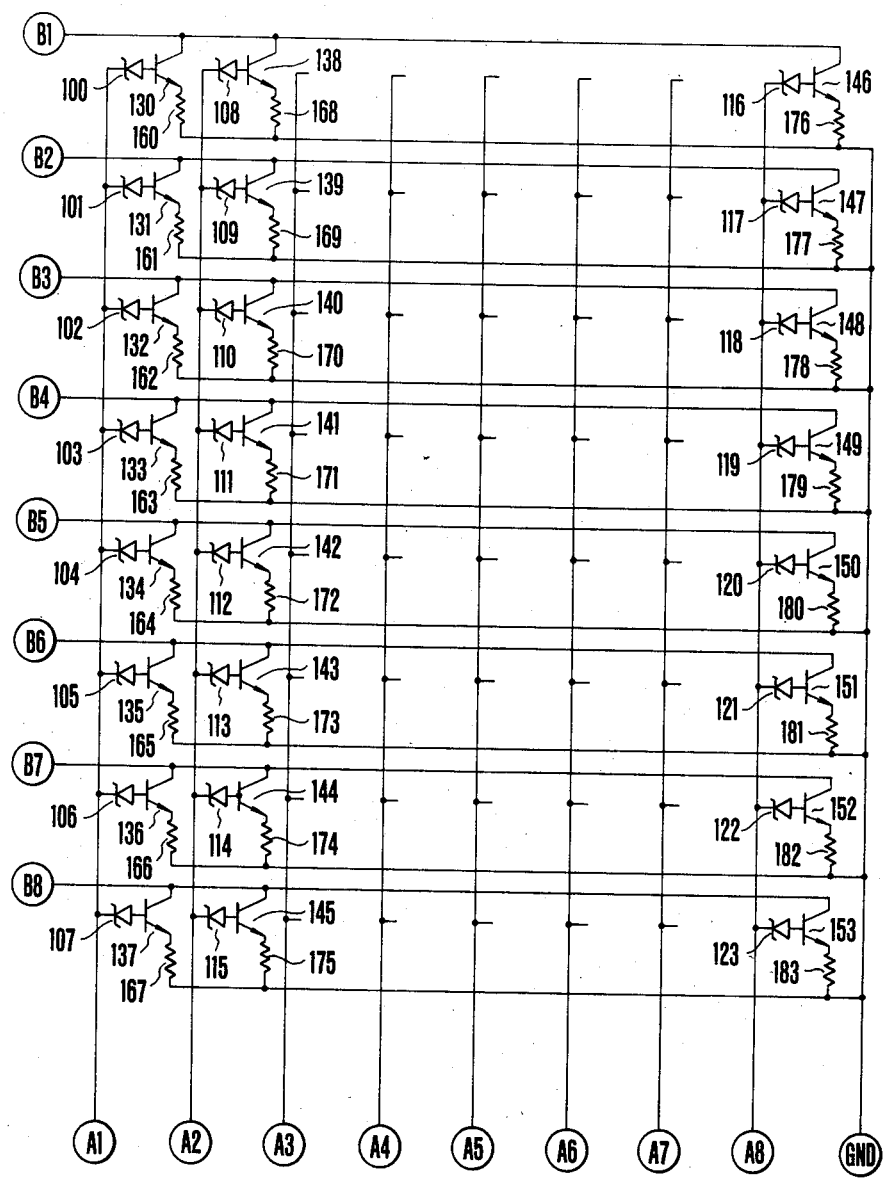
FIG. 3 is a circuit diagram showing an example of a P-ROM used for paging receivers.

A P-ROM to be incorporated into a conventional paging receiver is shown in FIG. 3. This P-ROM comprises diodes 100 to 123, transistors 130 to 153 and resistors 160 to 183. Voltage applied to data read signal lines A1, A2, ..., A8 is controlled such that it is supplied to or not supplied to the base of each of the transistors depending on whether or not the diodes are to be destroyed. Thus, the transistors are rendered either "on" or "off", whereby data which is either logic value "1" or "0" is read out from each of output signal lines B1, B2, ..., B8. Since the transistors are of an open collector construction, in actual practice the output signal lines B1, B2, ..., B8 must be connected to a power source through resistors in a decoder which makes use of data. Therefore, if the P-ROM is connected as in a prior art to be described with reference to FIG. 4, for processing data of merely 64 bits, 16 wiring conductors are necessary between the decoder and P-ROM.

Figure 4:
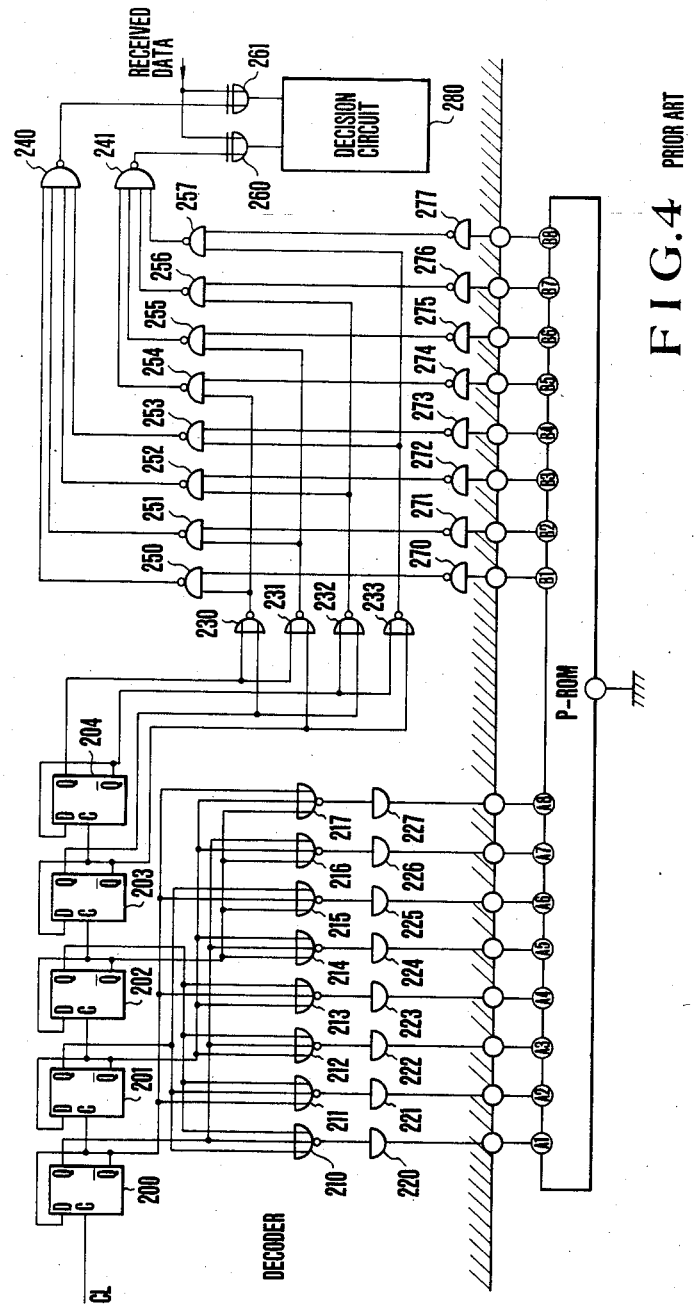
FIG. 4 is a circuit diagram showing an example of a prior art system for receiving two kinds of 32-bit paging numbers which uses the P-ROM shown in FIG. 3.

FIG. 4 shows a prior art example of the decoder construction and wiring between decoder and P-ROM in case where the P-ROM of FIG. 3 is used for a system for receiving two kinds of code pursuant to the signal format as described previously.

In FIG. 4, the decoder requires at least D-type flip-flops 200 to 204 constituting a counter, NOR gates 210 to 217 and buffers 220 to 227 for designating read locations of the P-ROM, NOR gates 230 to 233 for designating locations to which data is sent from the P-ROM, inverters 270 to 277, NAND gates 250 to 257 and 240 and 241, EXOR (exclusive OR) gates 260 and 261 for comparing contents of the two kinds of P-ROM with a received data, and a decision circuit 280 for judging from the output of the EXOR gates whether the received signal is the intended signal. Thus, for connecting the P-ROM to the external decoder, 16 wiring conductors are necessary.

If, in the system for receiving the POCSAG code as mentioned above wherein simultaneous reception of four kinds of paging number is necessary, the P-ROM as shown in FIG. 3 is used for the receiver, the scale of the decoder circuit and number of wiring conductors between the decoder and P-ROM are drastically increased as is clear from the example of FIG. 4.

Figure 5:
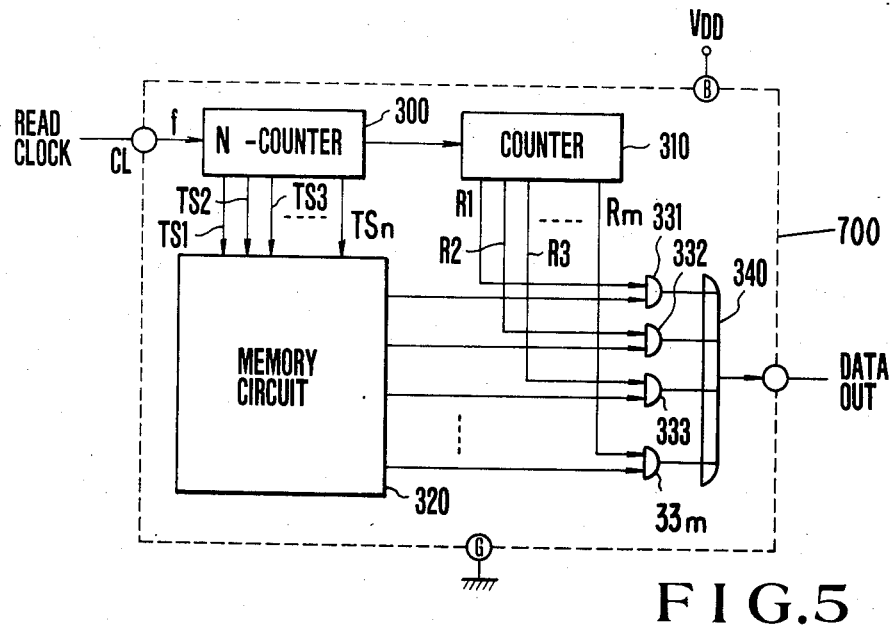
FIG. 5 is a block diagram showing a P-ROM with a built-in decoder according to the invention.
Figure 6:
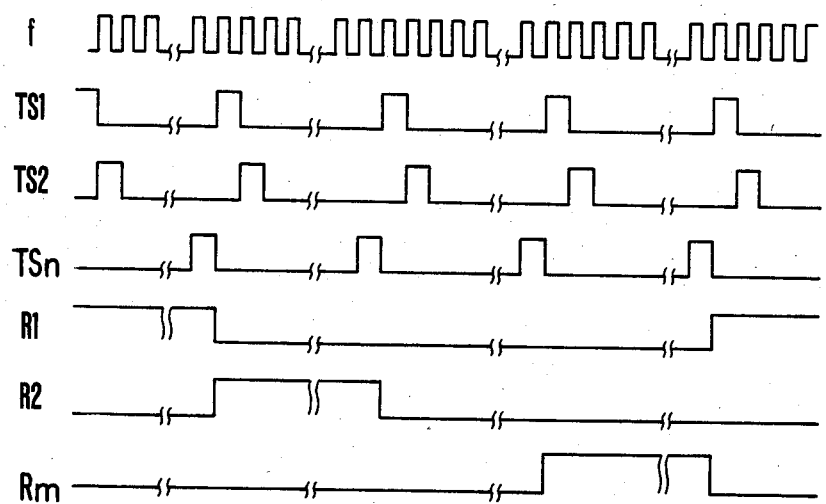
FIG. 6 is a time chart showing the operation of the circuit of FIG. 5.

FIG. 5 is a block diagram showing an embodiment of a P-ROM with a built-in decoder according to the invention. Reference numeral 300 designates an n-counter (n-nary counter); 310 a counter; and 320, a memory circuit in which memory cells as described previously in connection with FIG. 3 are arranged in the form of a matrix. Reference numerals 33*l* to 33*m* designate AND gates; and 340, an OR gate. FIG. 6 is a time chart for explaining the operation of various parts of the device shown.

In operation, when a read clock f of P-ROM is supplied to the n-counter 300 through a terminal CL, voltage is successively applied to read control lines TS1, TS2, ..., TSn in the memory circuit 320 having the matrix array in response to the clock, whereby the stored contents of the column corresponding to each control line, to which the voltage is applied, are read out. The read-out contents are supplied to one input terminal of each of the AND gates 33*l* to 33*m*. However, when the count of the counter 310 which is responsive to an overflow of the n-counter 300 is "0", only an output R1 is at logic "H" (high) level and all the other outputs R2 to Rm are logic "L" (low) level. Thus, only the AND gate 331 is enabled among the AND gates 331 to 33*m*, and all the other AND gates remain disabled.

The counter 310 effects counting each time the output TS1 is again changed to the logic "H" level following sequential change of the outputs TS1, TS2, ..., TSn to the logic "H" level. As a result, the outputs R1 to Rm are successively changed to the logic "H" level to activate the AND gates connected to the individual outputs R1 to Rm. The outputs are read out through the OR gate 340.

Specifically, n bits to be ANDed with the output R1, n bits to be ANDed with the output R2 ... and m bits to be ANDed with the output Rm constitute groups of data output, and these groups are sequentially delivered out of the built-in decoder. Especially, corresponding bits in the respective N kinds of information are grouped to provide an output in the form of a series of A1·B1·... X1·A2·B2·....·X2·....·Am·Bm·....·Xm. Thus, the n-counter 300, counter 310, AND gates 331 to 33*m* and OR gate 340 constitute a rearrangement decoder for grouping the corresponding bits in the respective N kinds of information.

Figure 7:
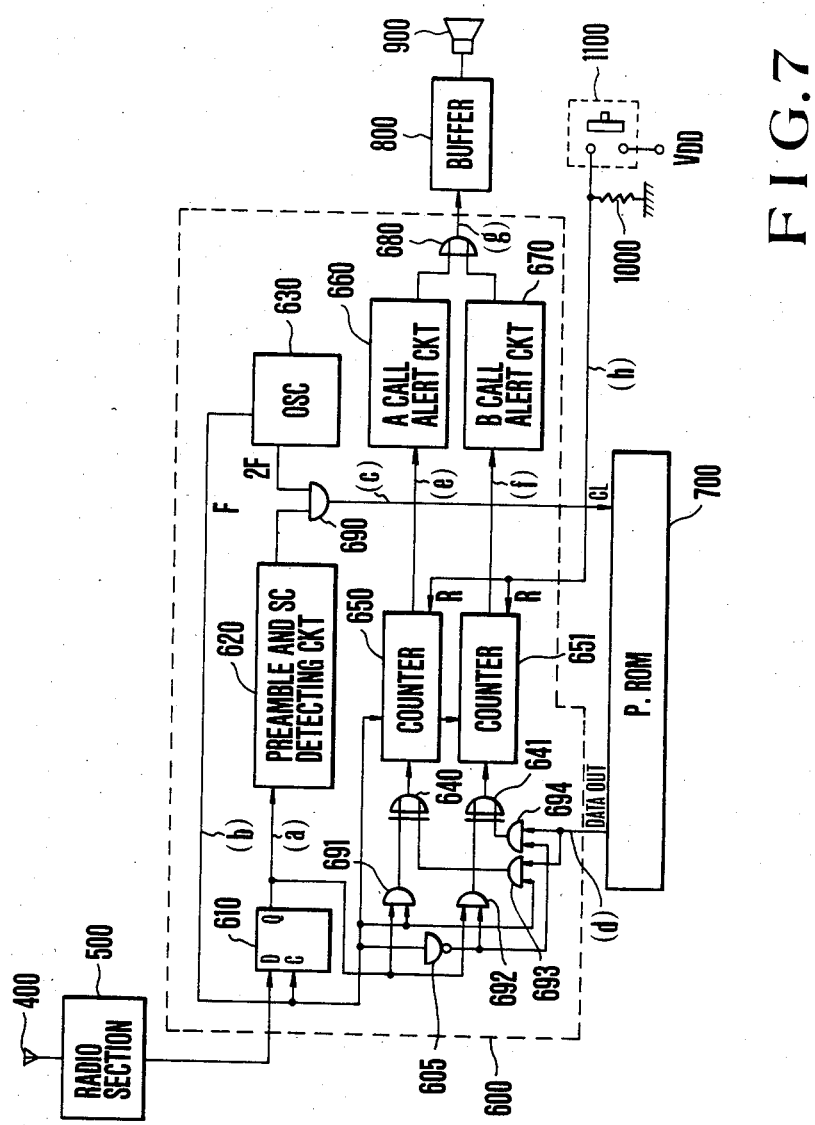
FIG. 7 is a block diagram showing an essential part of a paging receiver embodying the invention.

FIG. 7 shows a block diagram of a paging receiver embodying the invention which incorporates the circuit of FIG. 5 and which is constructed such that two independent kinds of code representative of paging numbers at A in the signal format of FIG. 1 can be received.

In FIG. 7, designated at 400 is an antenna which receives a carrier wave modulated with the signal as shown in FIG. 1 and supplies the received signal to a radio section 500. The radio section 500 demodulates the signal and supplies the demodulated signal to a decoder 600. The decoder 600 compares the contents of the P ROM 700 in which the paging numbers are stored with the received signal. If the coincidence of the two is confirmed, an alert circuit corresponding to the received signal is driven, and a loudspeaker 900 is driven through a buffer 800, thus informing the subscriber of the fact that there has been a call. The subscriber may, if necessary, stop the alert by depressing a switch 1100.

The operation of the decoder 600 will now be described with reference to a time chart of FIG. 8. A sync circuit 610 comprised of a D-type flip-flop is driven by an oscillator circuit 630 operating to generate a clock F ((b) in FIG. 8) (for instance at 200 Hz) corresponding to the intended received signal (for instance an NRZ code of 200 bits/sec.) and a doubled clock 2F. When the received signal ((a) in FIG. 8) is provided as the output of the sync circuit 610, the signal is coupled to a preamble and SC detecting circuit 620. When a predetermined preamble signal is detected during a period of presence of power supply by the receiver which makes effective use of the power source through intermittent power supply (commonly called battery saving), the battery saving is temporarily released, and power supply is continuously effected during a period sufficient to detect the following SC signal for establishing the frame synchronization.

Figure 8:
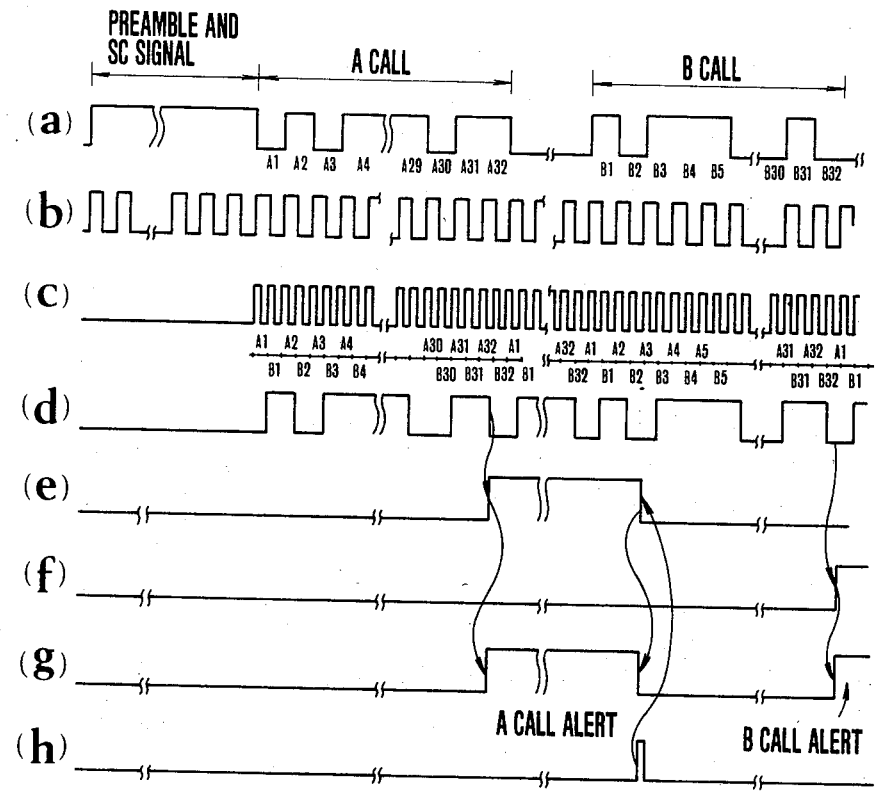
FIG. 8 is a time chart for explaining the operation of the receiver of FIG. 7.

When the frame synchronization is established by reception of the SC signal, the AND gate 690 is rendered active and the contents of the P-ROM 700 in which N (N=2 in the instant embodiment) paging numbers are stored is read out via a terminal DATA OUT of the P-ROM 700 (corresponding to terminal DATA OUT in FIG. 5) in response to the signal ((c) in FIG. 8) applied to a terminal CL of the P-ROM 700 (corresponding to terminal CL in FIG. 5) for detecting the following paging number. The stored data that is sequentially read out of the P-ROM 700 in a series of A1·B1·A2·B2·A3·B3 ... A30·B30·A31·B31·A32·B3-2·A1·B1 ... as shown at (d) in FIG. 8 is supplied to one input terminal of each AND gate 693 or 694 and is then supplied to one input terminal of each two-input EXOR gate 640 or 641 which acts as a comparator in response to logic of an input signal applied to the other input terminal of the AND gate 693 or 694.

The output ((a) in FIG. 8) of the sync circuit 610 is coupled to one input terminal of each AND gate 691 or 692, and is supplied to the other input terminal of each of the EXOR gates 640 and 641 in response to logic of an input signal applied to the other input terminal of each AND gate 691 or 692. Thus, the received input signal and the contents read out of the P-ROM 700 are compared at the EXOR gate 640 during the positive half period of the read clock ((b) in FIG. 8) of the received input signal and at the EXOR gate 641 during the negative half of the read clock. Namely, substantially simultaneous comparison of two kinds of the P-ROM data with the received input signal is effected. The output thus produced is supplied to counters 650 and 651 which produce a detecting pulse in response to the counting of the number of non-coincidence bits and determination thereof.

When the count of the counters 650 and 651 is less than a predetermined number ("1" in the instant embodiment), it is determined that the intended paging number has been detected, so that an A call alert circuit 660 is activated as shown at (e) in FIG. 8 to drive the loudspeaker 900 through an OR gate 680 and the buffer 800. As a result, the subscriber can confirm that there has been a call.

When subscriber operates the push switch 1100 after confirming a call, the receiver stops the alert of the A call. When a B call is detected, as shown at (f) in FIG. 8, after the A call alert has been stopped, the output of a B call alert circuit 670 is coupled through OR gate 680 and buffer 800 to drive the loudspeaker 900. Since the alert tone periods of the A and B calls are usually set to different values, the subscriber can confirm that there has been a B call.

The oscillator circuit 630 may be an astable multivibrator using transistor or an CR oscillator circuit. In the instant example, the D-type flip-flop 610 is constructed with μPD4013 (made by NEC), EXOR gates 640 and 641 are constructed with μPD4030 (made by NEC), and the counters 650 and 651 are constructed with μPD4017 or μPD4020 (made by NEC). As has been described, according to the embodiment, the number of wiring conductors between the decoder and P-ROM can be reduced from 16 to 2 as is apparent from comparison of FIG. 4 with FIG. 7.

What is claimed is:

1. A paging receiver comprising:
    a programmable read only memory (P-ROM) for storing bit information which is stored with N, N being an integer greater than 1, kinds of information and having a built-in decoder;
    means for sequentially reading out the contents stored in said P-ROM in response to a clock frequency which is N times or more the frequency of a clock corresponding to the bit rate of a received signal; and
    means for effecting substantially simultaneous comparison of the read out N kinds of stored contents with the received signal to determine whether the received signal is a paging signal assigned to said paging receiver.

2. A paging receiver according to claim 1 wherein bits in the respective N kinds of stored information are compared with corresponding bits in the received signal within one bit time period of the data represented by said received signal.

3. A paging receiver according to claim 1 wherein said built in decoder comprises a rearrangement decoder which rearranges the format of the N kinds of information stored in the P-ROM in m-bit format, m being a positive number, like A1·A2 ... Am, B1·B2 ... Bm and X1·X2 ... Xm, such that the corresponding bit units of the respective kinds of information output by said decoder are grouped like A1·B1 ... X1·A2·B2 ... X2 ... Am·Bm ... Xm.

4. A paging receiver according to claim 3 wherein said rearrangement decoder comprises a first counter responsive to the N times frequency clock for accessing the P-ROM, a second counter responsive to an overflow of said first couter to produce m outputs, AND gates connected to receive the m outputs of said second counter and m outputs of the P-ROM, and an OR gate responsive to the output of said AND gates to produce a sequential data output.

* * * * *

UNITED STATES PATENT AND TRADEMARK OFFICE
CERTIFICATE OF CORRECTION

PATENT NO. : 4,591,853

DATED : May 27, 1986

INVENTOR(S) : Mori

It is certified that error appears in the above-identified patent and that said Letters Patent is hereby corrected as shown below:

| COLUMN | LINE | DESCRIPTION |
|--------|------|-------------|
| 6 | 24 | delete "couter" and insert --counter-- |

Signed and Sealed this

Sixth Day of September, 1988

Attest:

DONALD J. QUIGG

*Attesting Officer*     *Commissioner of Patents and Trademarks*